United States Patent Office 3,039,840
Patented June 19, 1962

3,039,840
PROCESS FOR MANUFACTURING READILY DYE-
ABLE STEREO REGULATED POLYOLEFIN ARTI-
CLES AND METHODS FOR DYEING THE SAME
Albert R. Sawaya, Cleveland, Ohio, assignor, by mesne
assignments, to Hercules Powder Company, Wilmington, Del., a corporation of Delaware
No Drawing. Filed Oct. 12, 1960, Ser. No. 62,090
14 Claims. (Cl. 8—55)

This invention relates to the production of readily dyeable, stereo regulated polyolefin articles and to methods for dyeing the same. More particularly, this invention relates to a method for improving the dye receptivity of stereo regulated polyolefin articles by chemical treatment of such articles prior to dyeing, and to processes for dyeing such articles.

Filamentary articles including fibers, filaments, yarns, cords and the like formed from stereo regulated polyolefins such as isotactic polypropylene have been found to possess excellent tenacity as well as superior fatigue and abrasion resistance. In addition, filamentary articles made from stereo regulated polyolefin polymeric materials can be marketed at competitively attractive prices since such polymeric materials are relatively inexpensive. In order, however, for filamentary articles thus made to realize the widespread demand warranted by their physical properties, it is necessary that the articles be obtainable in a wide range of colors. Dyeing of such articles is difficult, however due to the fact that stereo regulated polyolefins are hydrophobic in nature, and the common dyestuffs will not penetrate into their interiors. In addition, stereo regulated polyolefins do not have sufficiently strong "dye sites" to enable dyestuffs to become firmly attached to the fibers; consequently, even those dyes which are capable of penetrating into the interior of the fibers are easily removed during the washing or dry cleaning of such fibers.

Several methods have been proposed for coloring such hard-to-dye stereo regulated polyolefin filamentary articles. One such method, commonly known as "pigment dyeing," comprises incorporating colored pigments into the filament forming material prior to its fabrication into filamentary articles. Stereo regulated olefinic materials which have been dyed with pigments in such a fashion can be manufactured in a variety of colors, and the colors obtained are relatively fast. Pigment dyeing is inconvenient, however, for the reason that a thorough cleaning of the filament forming equipment is required every time a change in colors is to be effected. Furthermore, in order to assure purchasers of a complete range of colors, it is necessary to maintain large, expensive inventories of stock.

Another method which has been suggested for coloring stereo regulated polyolefin filaments consists in introducing the dyestuffs into the filamentary articles by passing the articles through an aromatic hydrocarbon containing the desired dye. The filamentary articles become semipermeable due to the action of the hydrocarbon, thus facilitating entry of the dye substances into their interiors. While such a method provides an effective means for incorporating the coloring substances into the filamentary articles, it is subsequently difficult to remove the hydrocarbon agents from the articles sufficiently to insure the noninterference of such agents with the physical properties of the articles.

Now a process has been discovered which permits the dyeing of stereo regulated polyolefin filamentary and other articles in a wide range of colors. The method found is relatively inexpensive, and it permits the stereo regulated polyolefin articles to be dyed with a wide variety of dyestuffs; moreover, the colors introduced into the articles resist fading when exposed to light and have a high degree of resistance to extraction by dry cleaning solvents. In addition, the rate at which the method can be performed permits a continuous as well as a batch system to be employed, and the molecular weight of the polymer is substantially unaffected by the process.

In accordance with this invention, substantially color fast, dyed stereo regulated polyolefin articles can be produced by a process comprising contacting stereo regulated polyolefin articles with a member selected from the group consisting of phosphorus halides and phosphorus oxyhalides, and subsequently dyeing the phosphonated, stereo regulated polyolefin articles.

The stereo regulated polyolefin articles to be dyed are exposed to the phosphorus halide or phosphorus oxyhalide substances of the invention, a procedure which will hereafter be referred to as phosphonation, until the desired amount of phosphorus material is added to the articles. Generally, it has been found that the greater the phosphorus content of the article is, the deeper will be the shade of color obtained.

Following phosphonation, the articles can be dyed with basic dyes, neutral premetallized dyes or acid premetallized dyes by any of the conventional dyeing methods. If an acid dye is to be employed, however, the articles may be aminated following phosphonation by treating them with an alkyl polyamine; the articles are than capable of accepting acid type dyes as well as neutral premetallized and acid premetallized dyes.

In addition to the foregoing dyeing methods, however, a dyeing procedure has been found which permits the use of both basic dyes and acid dyes with the phosphonated articles of the invention. This latter dyeing process, which is the inverse of that normally used in the industry, will hereafter be referred to as "detergent effect dyeing." In conventional dyeing methods, a detergent or wetting agent is used to assist dyeing by promoting the wetting of the articles to be dyed. For this purpose an agent, which, if ionized, carries a charge identical to that carried by the dyeing substances, is chosen, i.e. a cationic or basic dye is dyed in the present of a cationic wetting agent while an anionic or acid dye is employed with an anionic wetting agent. It has now been discovered, however, that by reversing the type of wetting agent used, in other words by using an anionic wetting agent with a cationic dye, or a cationic wetting agent with an anionic dye, the phosphonated, stereo regulated polyolefin articles of the invention may be dyed with any dye of the types before mentioned. Irrespective of which of the dyeing procedures is used, however, the dyed products which result are remarkably color fast when they are extracted with dry cleaning solvents and/or exposed to light.

The exact mechanism by which the phosphonating compounds of the invention make possible the dyeing of normally dye resistant, stereo regulated polyolefin articles is not fully understood. One theory which has been proposed, however, is that the phosphonating compounds unite with the stereo regulated polyolefins, in the presence of air, to form phosphonyl chloride radicals on the articles. The phosphonyl group is, in turn, hydrolyzed by moisture to produce the corresponding phosphonic acid. Such a theory could explain why phosphonated, stereo regulated polyolefins readily accept basic dyes while resisting acid dyes. The suggested mechanism would also explain the ease with which the phosphonated, stereo regulated polyolefins can be aminated. It may, however, be that the phosphonating compounds interact with stereo regulated polyolefins to form a mechanical rather than a chemical bond.

The mechanism of the "detergent effect" is equally uncertain; it has been noticed, however, that when dyes are used which have a charge opposite to that carried by the dye bath wetting agen, the dye substances appear to assume an insoluble, finely divided form. It is possible that dyes in such a state are more strongly attracted to the dye sites produced by the phosphonation treatment and are more tenaciously held thereby. Whatever the mechanism may be, however, the treatment of polyolefin articles with the phosphonating materials disclosed produces a readily dyeable product, and the use of "detergent dyeing" enables a wide variety of dyestuffs to be employed in the dyeing process.

Although the process contemplates the dyeing of articles formed from any stereo regulated polyolefin material, much greater advantages are realized when the process is employed to dye articles manufactured from isotactic poly-α-olefins formed from monomers containing at least three carbon atoms. Examples of suitable isotactic poly-α-olefins of the latter type are, for instance, isotactic polypropylene, isotactic poly-α-butylene and the like. In its preferred embodiment, however, the process of the invention is used to dye isotactic polypropylene.

Suitable phosphonating agents include any of various phosphorus containing compounds in a fluid form, i.e., in the form of a vapor, liquid or solution, however the use of phosphorus halide or phosphorus oxyhalide compounds is particularly advantageous for the purposes of the invention. Examples of suitable compounds include, for instance, phosphorus trichloride, phosphorus pentachloride, phosphorus oxychloride and the like. Particular advantages are realized, however, when phosphorus oxychloride is employed as the phosphonating agent. The phosphonating substances contemplated by the invention apparently react in similar fashion, and require substantially identical reaction conditions; some of the compounds are solids at lower temperatures, however, and at temperatures below their melting point, such compounds require solution in a solvent to function properly as phosphonating materials. Any of the suitable solvents well-known in the art such as, for instance, carbon tetrachloride are satisfactory for the purpose. While oxygenated, phosphonated compounds have been used in the dyeing processes herein disclosed, the amount of oxygen present need not exceed that which is in equilibrium with the phosphonating substances due to the contact of the latter with the atmosphere. If desired, however, additional oxygen may be supplied by passing either pure oxygen or an oxygen containing gas, such as air, through the solution during the phosphonation.

The stereo regulated polyolefin articles may be treated by the phosphonating agents while the latter are in a liquid form. This can be done by suspending the articles in a bath of the phosphonating substances, by passing the articles continuously through a bath containing such substances or in similar ways. Alternatively, however, the treatment may be carried out by exposing the articles to phosphonating agents maintained in a vapor phase. In any case, the length of contact time of the articles with the phosphonating substances is determined by the amount of phosphorus material which it is desired to incorporate into the articles. As the process is usually practiced, however, contact times of five minutes or less are employed.

Although the exact nature of the phosphorus material which produces dyeability in stereo regulated polyolefin articles has not been determined and may consist of elemental phosphorus or a compound or radical containing phosphorus, generally, the greater the phosphorus content of the polyolefin articles, the deeper will be the shade obtained when such articles are dyed. Particularly deep shades have been obtained when the phosphorus contained by the articles constitutes at least about 0.25% of the article's weight, however, a lesser amount of phosphorus may be incorporated into the articles when lighter shades are desired. The amount of phosphorus which is introduced into the stereo regulated polyolefin articles depends upon, among other things, the temperature at which phosphonation is carried out, the concentration of the phosphonating substances, the length of contact time of the articles with such substances, and like considerations.

The phosphonation of the stereo regulated polyolefin articles may be performed with concentrated phosphonating agents or, if desired, nonaqueous, organic diluents may be included. In order to facilitate dye penetration into the interior of the articles, such diluents may take the form of swelling agents, i.e., materials having a slight solvating effect on the stereo regulated polyolefin articles. The diluents may, however, be inert nonsolvating substances added for other purposes such as, for instance, to control the rate of phosphonation or to adjust the boiling point of the phosphonating substance. It has been found that the rate at which phosphorus material can be introduced into the stereo regulated polyolefin articles is directly proportional to the concentration of the phosphonating substances, i.e., the more concentrated the phosphonating agents employed, the more rapid is the addition of phosphorus material to the articles. In the preferred embodiment of the invention, concentrated phosphonating substances are used.

The phosphonation of the stereo regulated polyolefin articles may be carried out at any convenient temperature, and may even be performed at temperatures above the boiling point of the phosphonating substances if provision is made for carrying the treatment out under pressure. Since the rate at which the phosphorus material can be combined with the stereo regulated polyolefin articles increases with an increase in temperature, the higher temperature ranges are especially attractive for carrying out the process. This is true even though the possibility of adversely affecting the physical properties of the articles increases as the temperature of phosphonation is increased since such an effect may be avoided by a suitable reduction in the time of contact between the phosphonating agents and the articles. Temperatures in the range between room temperature, that is, at between 20° C. and 30° C., and the boiling point of the phosphonating substances have been found to be particularly suitable for practicing the invention.

Stereo regulated polyolefin articles which have been phosphonated according to the process of the invention can be readily dyed with basic dyes, neutral premetallized dyes, and acid premetallized dyes; such articles, however, resist dyeing with acid dyes. Inasmuch as the acid type dyes constitute an important and widely used group of dyes, it is of considerable advantage for a dyeing system to be adapted to use such dyes. One of the ways by which such articles can be made receptive to acid type dyes is through the introduction of nitrogenous materials into the articles; such an addition can be achieved by subjecting the articles to an amination treatment. Amination of the stereo regulated polyolefin articles is carried out by treating the articles with any of various alkyl polyamines such as, for instance, ethylene diamine, m-xylylene diamine, triethylenetetramine, hexamethylene diamine and the like. The amination treatment can be carried out in the presence of concentrated liquid polyamines, however, it can also be performed in aqueous solutions of such polyamines, and the use of an aqueous polyamine solution is particularly advantageous when the polyamine is a gas at ordinary temperatures and pressures. The reaction may be initiated at room temperature, but a more rapid amination is obtained through the use of amination solutions maintained at elevated temperatures, e.g., above 50° C. The amination is carried out by contacting the articles with the aminating solution until the desired amount of nitrogenous material has been added, i.e., that amount necessary to cause the articles to accept acid dyes. The nitrogen content of the articles following satisfactory amination is approximately the same, on a weight basis, as the phosphorus content of the articles. The amination reaction proceeds quite rapidly at elevated temperatures, and with a treatment time of no more than a minute, a stereo regulated polyolefin article which resists basic dyestuffs and accepts acid dyes is produced. Aminated filamentary and other articles are readily dyed with neutral premetallized dyes and acid premetallized dyes as well as with the acid dyes.

In addition to the dyeing procedures previously mentioned, a method has been found which permits the stereo regulated polyolefin articles of the invention to be dyed with acid as well as with basic dyes. This process, known as "detergent effect dyeing," can be used to dye articles which have been phosphonated in accordance with the procedure previously outlined. The detergent dyeing process is performed in a dye bath containing a wetting agent which carries a charge opposite to that carried by the dye. When, for example, a basic type, cationic, dye is used, the dyeing is carried out in the presence of an anionic wetting agent; when an acid, or anionic, dye is employed, a cationic wetting agent is used. Any cationic wetting agent as, for instance, Peregal OK—an ethylene oxide condensation product with an organic amine made by the General Aniline and Film Corp., Synthramine A—cetyl trimethyl ammonium bromide produced by Arnold Hoffman and Co., lauryl pyridinium chloride and the like are suitable for detergent dyeing purposes. Likewise, any anionic wetting agent such as Sulframine AB—an alkyl aryl sulfonate product of the Ultra Chemical Works, Inc., Igepon T— a substituted amide manufactured by the General Aniline and Film Corp., Duponal D—a long chain alcohol sulfate compound made by the E. I. du Pont Nemours Co., or other anionic detergent is suitable for purposes of the invention.

The dyeing of phosphonated, stereo regulated polyolefin articles can be accomplished through use of any of the usual dyeing techniques. Normally, however, filamentary articles are scoured with a detergent prior to dyeing, and the dyeing is performed in the presence of deionized water which contains a small amount, from .03% to .15% by weight, although greater or lesser amounts of detergent may be used, of a wetting agent. In the case of detergent dyeing, the wetting agent is of the anionic or cationic type, depending upon the dye selected, while for nondetergent dyeing the wetting agent may be either of an ionic or nonionic nature. The hydrogen ion concentration may be adjusted, if desired, by the addition of a suitable amount of acetic or other acid. The article is introduced into the dye bath, and the latter is brought to a boil and maintained there long enough to insure adequate dyeing. The articles are thereafter withdrawn and subjected to a post dyeing detergent scour to remove any unattached dyestuff.

The following examples, while not intended to be limiting in nature, are illustrative of the invention.

*Example I*

Two grams of isotactic polypropylene knitted fabric were immersed in boiling, 72° C., phosphorus trichloride for one minute. Following phosphonation, the fabric was removed and dried for thirty minutes to remove excess reagent. The knitted fabric was then rinsed with water until the wash solution effluent was neutral, as evidenced by its effect on blue litmus paper. Analysis of the fabric at this point showed it to contain 0.53% phosphorus and substantially no chlorine. The molecular weight of the isotactic polypropylene following the phosphonation was the same as that prior to treatment.

The phosphonated knitted fabric was subsequently scoured for thirty minutes at 95° C. in a 0.1%, by weight, aqueous solution of Triton X-100, an alkyl aryl polyether alcohol made by the Rohm and Haas Co. Following scouring, the fabric was placed in a dye bath containing 0.05% by weight of Sevron Green B, a basic dyestuff manufactured by the E. I. du Pont de Nemours Co., in 200 mm. of distilled water. The pH of the dye bath was adjusted to 3.5 with acetic acid, and 0.1 gram of Sulframine AB was added to the solution prior to the introduction of the fabric sample. After immersion of the sample, the temperature of the dye bath was raised to the boiling point, a process which required thirty minutes, and kept there for one hour. The fabric was then removed and scoured at 50° C. for an additional thirty minutes in water containing 0.5%, by weight, of Triton X-100. After scouring, the sample was removed and dried. The dyed sample was a deep shade of green and was substantially wash fast.

When phosphonation according to the above procedure is carried out using phosphorus oxychloride rather than phosphorus trichloride as the phosphonating agent, the results obtained are substantially the same.

*Example II*

A two gram sample of isotactic polypropylene knitted fabric, phosphonated in the manner of Example I, was scoured at 95° C. for thirty minutes in an aqueous solution containing 0.1%, by weight, of Triton X-100. The fabric was then placed in a dye bath containing 0.05% by weight of Cibalan Blue BRL, a neutral premetallized dye produced by the Ciba Co. Inc., in water. The pH of the dye solution was adjusted to approximately 3.5, and 0.1 gram of Irgasol DA, a wetting agent manufactured by the Geigy Chemical Co., was added. The temperature of the dye solution was gradually raised to the boiling point over a period of thirty minutes and maintained there for one hour. The fabric was then removed from the dye bath and scoured in the manner disclosed in Example I. The knitted fabric, which was dyed by the process to a light shade of blue, proved to be substantially wash fast.

*Example III*

Two grams of isotactic polypropylene knitted fabric were immersed for one minute in phosphorus trichloride maintained at 72° C. The fabric was thereafter withdrawn from the phosphonating agent and allowed to dry in air for thirty minutes before being thoroughly rinsed with water. The knitted fabric was subsequently placed in an aminating solution consisting of 70%, by weight, of ethylene diamine in water. The solution was kept at a temperature of 65° C. to 70° C. and the treatment continued for approximately thirty minutes. The fabric was then removed from the aminating solution and rinsed with water until a neutral wash solution, as shown by red litmus paper, was obtained. An analysis of the isotactic polypropylene fabric showed it to contain 0.33% by weight of phosphorus and 0.28% by weight of nitrogen.

The aminated fabric was subsequently dyed to a medium shade of blue in a dye bath comprised of 200 ml. of a .05%, by weight, aqueous solution of Alizarine Sky Blue BSCF, an acid dye made by the General Aniline and Film Corp., containing 0.1 gram of Sulframine AB. The dyeing procedure was carried out as disclosed in Example I, and the dyed material was scoured as specified therein. The dyed sample exhibited a very high order of resistance to dye extraction by Perclene (tetrachloro ethylene), one of the common dry cleaning solvents.

*Example IV*

Two grams of isotactic polypropylene knitted fabric, phosphonated and aminated as described in Example III, were dyed in 200 ml. of an aqueous dye solution containing .05% by weight of Cibalan Blue BRL and 0.1 gram of a wetting agent. The dyeing procedure was the same as that of Example I, and the dyed sample was scoured as disclosed therein. Following dyeing, the fabric exhibited a medium shade of blue and possessed excellent light stability as well as a marked resistance to extraction with Perclene.

*Example V*

A sample of isotactic polypropylene knitted fabric weighing two grams was immersed for one minute in phosphorus trichloride heated to 72° C. Following phosphonation, the sample was withdrawn, rinsed with water and dyed. The dye solution contained .05% by weight of Sevron Green B, a cationic dye, and 0.1 gram of Sulframine AB, an anionic wetting agent; the dyeing was accomplished as disclosed in Example I. After dyeing, the sample was scoured in Triton X–100, in the manner of Example I, and dried. The fabric, which was dyed by the process to a deep shade of green, proved to be substantially wash fast.

A similarly processed sample is dyed in the presence of Igepon T, an anionic wetting agent, to a deep shade of green. Irrespective of the wetting agent used, however, the dyed fabrics are substantially wash fast.

*Example VI*

A sample of isotactic polypropylene knitted fabric weighing two grams was phosphonated as disclosed in Example I. The sample was then dyed according to the method of Example I in 200 ml. of an aqueous solution containing .05% by weight of Alizarine Sky Blue BSCF, an anionic dye, and 0.1 gram of Peregal OK. Examination of the fabric subsequent to scouring showed it to have acquired a medium shade of blue and to possess very good wash fastness.

Dyeing carried out in accordance with the process of the invention produces filamentary articles which display uniformly deep ring dyeing, dye penetration being obtained in most cases through at least one quarter of the radius of the fiber's cross section. In addition, phosphonation dyeing of stereo regulated, polyolefin filamentary articles does not promote molecular weight reducing chain scission; the tensile strengths of articles phosphonated at room temperature are unaffected, and in no case are such properties substantially affected when the process is carried out as disclosed. Moreover, the phosphonating reagents taught are relatively inexpensive, a fact of importance in determining the commercial worth of a dyeing process; the phosphonation rates are of a high order and the amination reaction is fast enough to be considered ionic in character. The process, lends itself, therefore, to low cost, continuous processing.

What is claimed is:

1. A stereo regulated polyolefin article capable of being dyed to substantially fast colors produced by a process comprising applying to a stereo regulated polyolefin article a fluid phosphonating agent selected from the group consisting of phosphorus halides and phosphorus oxyhalides.

2. An isotactic polypropylene article capable of being dyed to substantially fast colors produced by a process comprising applying to a stereo regulated polyolefin article a fluid phosophonating agent selected from the group consisting of phosphorus halides and phosphorus oxyhalides.

3. A process for treating stereo regulated polyolefin articles whereby they are rendered readily dyeable comprising applying to stereo regulated polyolefin articles a fluid phosphonating agent selected from the group consisting of phosphorus halides and phosphorus oxyhalides.

4. A process for treating isotactic poly-α-olefin articles whereby they are rendered readily dyeable comprising applying to articles formed from isotactic poly-α-olefin polymers having at least three carbon atoms per monomeric unit, a fluid phosphonating agent selected from the group consisting of phosphorus halides and phosphorus oxyhalides.

5. A process according to claim 4 in which the phosphonating agent is phosphorus oxyhalide.

6. A process according to claim 4 in which the phosphonating agent is phosphorus trichloride.

7. A process according to claim 4 in which the phosphonating agent is phosphorus pentachloride.

8. A process for treating isotactic polypropylene filamentary articles whereby they are rendered readily dyeable comprising applying to isotactic polypropylene filamentary articles a fluid phosphonating agent selected from the group consisting of phosphorus halides and phosphorus oxyhalides, said application taking place at a temperature in the range of from at least about room temperature to no more than the boiling temperature of the phosphonating agent.

9. A process for dyeing stereo regulated polyolefin to substantially fast colors comprising applying to stereo regulated polyolefin articles a fluid phosphonating agent selected from the group consisting of phosphorus halides and phosphorus oxyhalides and subsequently dyeing the articles.

10. A process according to claim 9 in which the dyeing process comprises treating the phosphonated articles with a dye selected from the group consisting of basic dyes, neutral premetallized dyes, and acid premetallized dyes.

11. A process according to claim 9 in which the dyeing process comprises treating the phosphonated articles with an alkyl polyamine and subsequently with a dye selected from the group consisting of acid dyes, neutral premetallized dyes, and acid premetallized dyes.

12. A process according to claim 11 in which the alkyl polyamine is a member selected from the group consisting of ethylene diamine, m-xylylene diamine, triethylenetetramine and hexamethylene diamine.

13. A process according to claim 9 in which the dyeing process comprises treating the phosphonated articles in a dye bath including an ionic wetting agent and a dye having a charge opposite to that of the wetting agent.

14. A process for dyeing isotactic polypropylene filamentary articles to substantially fast colors comprising applying to isotactic polypropylene filamentary articles a fluid phosphonating agent selected from the group consisting of phosphorus halides and phosphorus oxyhalides, said application taking place at a temperature in the range from at least about room temperature to no more than the boiling temperature of the phosphonating agent, drying the phosphonated articles, and subsequently dyeing said phosphonated articles in a dye bath including an ionic wetting agent and a dye having a charge opposite to that of the wetting agent.

References Cited in the file of this patent

J.S.D.C., October 1949, pages 469–478.